(12) United States Patent
Lu et al.

(10) Patent No.: US 6,671,595 B2
(45) Date of Patent: Dec. 30, 2003

(54) VEHICLE SIDE SLIP ANGLE ESTIMATION USING DYNAMIC BLENDING AND CONSIDERING VEHICLE ATTITUDE INFORMATION

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 10/041,246

(22) Filed: Jan. 8, 2002

(65) Prior Publication Data

US 2003/0130775 A1 Jul. 10, 2003

(51) Int. Cl.[7] .................................................. B60T 8/24
(52) U.S. Cl. ......................... 701/36; 701/74; 340/438; 180/197
(58) Field of Search ................................. 701/1, 36–38, 701/41, 42, 70–75; 340/438, 440; 180/197

(56) References Cited

U.S. PATENT DOCUMENTS

| | | | | |
|---|---|---|---|---|
| 5,375,057 A | * | 12/1994 | Ackermann | 701/42 |
| 5,640,324 A | * | 6/1997 | Inagaki | 701/70 |
| 5,642,281 A | * | 6/1997 | Ishida et al. | 701/41 |
| 5,732,377 A | | 3/1998 | Eckert | |
| 6,128,569 A | | 10/2000 | Fukushima | |
| 6,236,926 B1 | * | 5/2001 | Naitou | 701/70 |
| 6,324,445 B2 | * | 11/2001 | Tozu et al. | 701/1 |
| 6,456,920 B1 | * | 9/2002 | Nishio et al. | 701/70 |

* cited by examiner

Primary Examiner—William A. Cuchlinski, Jr.
Assistant Examiner—Eric M Gibson
(74) Attorney, Agent, or Firm—Gregory P. Brown

(57) ABSTRACT

A method and system (18) for determining a side slip angle for an automotive vehicle (10) includes various sensors such as a yaw rate sensor (28), a speed sensor (20), a lateral acceleration sensor (32), a roll rate sensor (34), a steering angle sensor (35), and a longitudinal acceleration sensor (36). Each of the sensors are coupled to a controller (26) that determines a side slip angle velocity in response to the sensor signals. The side slip angle velocity is compensated for due to gravity and vehicle attitude changes. Also, the side slip angle velocity is compensated for due to the non-linearity of the side slip angle. The side slip angle velocity is integrated, preferably with an anti-drift integration filter (to determine an integrated side slip angle). A steady state side slip angle is also determined based on the sensors such as the yaw rate sensor and the lateral acceleration sensor. The steady state side slip angle is filtered using a steady state recovery filter (74). The integrated side slip angle and the steady state side slip angle are combined to form a side slip angle estimate.

24 Claims, 2 Drawing Sheets

VEHICLE SIDE SLIP ANGLE ESTIMATION USING DYNAMIC BLENDING AND CONSIDERING VEHICLE ATTITUDE INFORMATION

TECHNICAL FIELD

The present invention relates generally to a control apparatus for controlling a system of an automotive vehicle in response to sensed dynamic behavior and in response to various road and driving conditions, and more specifically, to a method and apparatus for controlling the yawing and lateral motion of the vehicle by determining its side slip angle.

BACKGROUND OF THE INVENTION

Vehicle dynamics control systems for automotive vehicles have recently begun to be offered on various products. Vehicle dynamics control systems typically control the yaw of a vehicle by controlling the braking effort at the various wheels of the vehicle, which is also called yaw stability control (short to YSC) or ESP. YSC systems typically compare the desired direction of the vehicle based upon the steering wheel angle and yaw rate sensor and the direction of travel, and the vehicle side slip angle and the desired side slip angle. By regulating the amount of braking at each corner of the vehicle, the desired direction of travel may be maintained, and the severe lateral sliding of the vehicle may be avoided. Typically, YSC systems do not address the influence vehicle body attitude variations on the vehicle side slip angle, one of the key variables needed to be regulated. For high profile vehicles in particular, the activation of the yaw stability control system is usually coupled with the introduction of vehicle attitude variations. On the other hand, the road condition also contributes to vehicle global attitude variations. For example, the driver's aggressive steering input could cause large roll attitude variation of the vehicle; during off-road driving, the large road bank and slope will be experienced through vehicle attitude changes. Neglecting the effect of the vehicle attitude information might cause control problems during aggressive maneuvers or maneuvers on banked road. For example, a vehicle with large lateral acceleration maneuvers could achieve 6 degree of relative roll angle between the vehicle body and a level road surface. If such a vehicle is driven in 45 mph, an error of rate 3 deg/sec will be introduced in many known side slip angle computation methods. If the same vehicle is driven on a 10 degree banked road, an error of rate 8 deg/sec will be introduced. That is, a 2 second maneuver in this case will end up with 16 degree error in side slip angle estimation.

On top of the yaw stability control system, the vehicle may also be equipped with the roll stability control system (short to RSC). The roll stability control system aims to alter the vehicle attitude such that its motion along the roll direction is prevented from achieving a predetermined limit (rollover limit) with the aid of the actuation from the available active systems such as controllable brake system, steering system and suspension system. The vehicle body attitudes are one type of key variables estimated in the roll stability control systems. It is desired to use such vehicle attitude information to help get accurate vehicle side slip angle for YSC system.

The side slip angle $\beta$ and its velocity (time derivative) measure the lateral stability of a driving condition of a moving vehicle. It has been used in vehicle yaw stability control systems, for example see U.S. Pat. No. 5,732,377.

There are two main methods used in the literature. The first method solves the side slip angle $\beta$ from a nonlinear differential equation, which is obtained approximately as the following:

$$\dot{\beta} = \frac{a_y - \omega_z v_x}{v_x} - \frac{\dot{v}_x}{v_x}\beta \tag{1}$$

where $a_y$ is the lateral acceleration, $\omega_z$ is the yaw rate, and $v_x$ is the scalar velocity of the vehicle. The second method uses the so-called linear bicycle model to characterize the side slip angle $\beta$, then solve it based on the available sensor signals. Examples are found in U.S. Pat. Nos. 5,732,377 and 6,128,569 where the steering wheel angle sensor signal is usually used.

In U.S. Pat. No. 5,732,377 it is argued that the disadvantage of the first method is the sensitivity to measurement noise and the cumulative integration error (or the drift of the integration), which could make the determination of the side slip angle $\beta$ highly inaccurate. However, the first method is valid even when the vehicle is driven in the nonlinear range of the vehicle lateral dynamics. This, however, is the operating range which benefits from yaw stability control (YSC). Although the second method is not as sensitive to sensor noise and does not have integration drift problem, it is only valid when the vehicle is driven in the linear range of its lateral dynamics. As a result, this method yields a "linear" $\beta$ which a yaw stability control system should not respond to and which is far from the dynamic range that the YSC system is intended to control.

In order to take advantage of both methods, U.S. Pat. No. 5,732,377 uses the combination of the side slip angle from the first method and the second to calculate the actual $\beta$ by using the weighted sum. This way of determining side slip angle still has the following drawbacks: (i) the cumulative integration error is not eliminated, the weighted sum only reduces the impact of this error source in comparison with each individual method; (ii) the estimation from the second method is not accurate at all when the vehicle is driven in the nonlinear range of its lateral dynamics; (iii) the cornering stiffness used in the second method is directly related to the road surface friction $\mu$, a constant value would not be able to cover road conditions from low $\mu$ surface to high $\mu$ surface. Besides those disadvantages, the first method is approximately obtained by assuming $2\beta$ as a small angle instead of $\beta$, i.e., the dynamic range for $\beta$ is only half of what is intended in those known methods. Another drawback of this system is that the vehicle attitude influence in the determination of $\beta$ is not considered.

It has been observed that whenever a vehicle turns, the vehicle experiences certain attitude changes, and the activation of YSC system sometimes coupled with even large vehicle attitude changes. On the other hand, prior to entering a rollover event, the vehicle will experience dramatic attitude changes. A large roll attitude change may introduce a large gravity effect in the output of the lateral acceleration sensor. Hence during aggressive maneuvers, the first method is no longer accurate due to the large gravity contamination in the lateral acceleration sensor signal.

It would therefore be desirable to provide a method that improves the side slip angle determination used in many existing YSC systems by compensating the gravity effect through vehicle attitude, by considering its true physical dynamic region and by dynamically blending.

SUMMARY OF THE INVENTION

The present invention provides an improved way to determine the side slip angle of a motor vehicle driven on all road and driving condition. A yaw stability control system or other safety systems (like roll stability control system, etc) uses the improved side slip angle to command a handling and/or safety device.

In one aspect of the invention, a method and system for determining a side slip angle for an automotive vehicle includes various sensors such as a yaw rate sensor, a speed sensor, a lateral acceleration sensor, a roll rate sensor, a steering angle sensor, and a longitudinal acceleration sensor. Each of the sensors are coupled to a controller that determines a side slip angle velocity in response to the sensor signals. The side slip angle velocity is compensated for due to gravity and vehicle attitude changes. Also, the side slip angle velocity is compensated for due to the non-linearity of the side slip angle. The side slip angle velocity is integrated, preferably with an anti-drift integration filter (to determine an integrated side slip angle). A steady state side slip angle is also determined based on the sensors such as the yaw rate sensor and the lateral acceleration sensor. The steady state side slip angle is filtered using a steady state recovery filter. The integrated side slip angle and the steady state side slip angle are combined dynamically (in comparison with the weighted sum of constant weights) to form a side slip angle estimate.

Advantageously, drift due to integration errors are removed from the system. Also, the system allows the side slip angle to be in a relatively large dynamic range in contrast to previously known systems.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
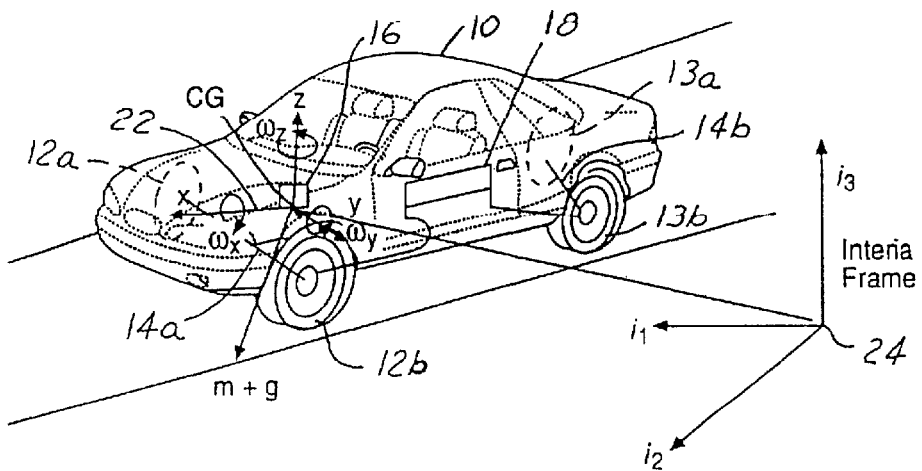
FIG. 1 is a perspective view of an automotive vehicle having a safety control system for determining side slip according to the present invention.

In the following figures the same reference numerals will be used to identify the same components. The present invention is preferably used in conjunction with a yaw stability control system for a motor vehicle. However, the present invention may also be used with other safety systems including a roll stability control system, or a deployment device such as airbag or roll bar.

The present invention estimates and predicts the side slip angle used in a yaw stability control system which prevents the vehicle from spinning out and which helps the vehicle to follow the desired path matching the driver's intention. The estimated and predicted side slip angle is used to construct the feedback yawing moment which commands the available actuators. In detail, the yaw control action uses the estimated side slip angle, the measured vehicle yaw rate, the desired variables calculated based on the driver's intention interpreter, and road condition identifiers. The yaw control flag is set based on a series of logic processes. In the case of a positive determination of a yawing event, the control commands computed through feeding back the estimated vehicle side slip angle variables and angular rate signals will be sent to drive the actuators through the YSC controller.

Referring to FIG. 1, an automotive vehicle 10 with a handling and safety system of the present invention is illustrated with the various forces and moments thereon during a yawing or a rollover condition. Vehicle 10 has front right and front left tires 12a and 12b and rear right tires 13a and left rear tires 13b respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels or vice versa. Generally, the vehicle has a weight represented as Mg at the center of gravity of the vehicle, where M is the total vehicle mass and g=9.8 m/s$^2$.

As mentioned above, the system may also be used with active/semi-active suspension systems, anti-roll bar or other safety devices deployed or activated upon sensing predetermined dynamic conditions of the vehicle.

The sensing system 16 is coupled to a control system 18. The sensing system 16 preferably uses a standard yaw stability control sensor set (including lateral accelerometer, yaw rate sensor, steering angle sensor and wheel speed sensor) together with a roll rate sensor and a longitudinal accelerometer. The various sensors will be further described below. The wheel speed sensors 20 are mounted at each corner of the vehicle, and the rest of the sensors of sensing system 16 are preferably mounted directly on the center of gravity of the vehicle body, along the directions x,y and z shown in FIG. 1. As those skilled in the art will recognize, the frame from x,y and z is called a body frame 22, whose origin is located at the center of gravity of the car body, with the x pointing forward, y pointing off the driving side (to the left), and the z pointing upward. The angular rates of the car body are denoted about their respective axes as $\omega_x$ for the roll rate, $\omega_y$ for the pitch rate and $\omega_z$ for the yaw rate. The present invention calculations may also take place in an inertial frame 24 that may be derived from the body frame 22 as described below.

Figure 2:
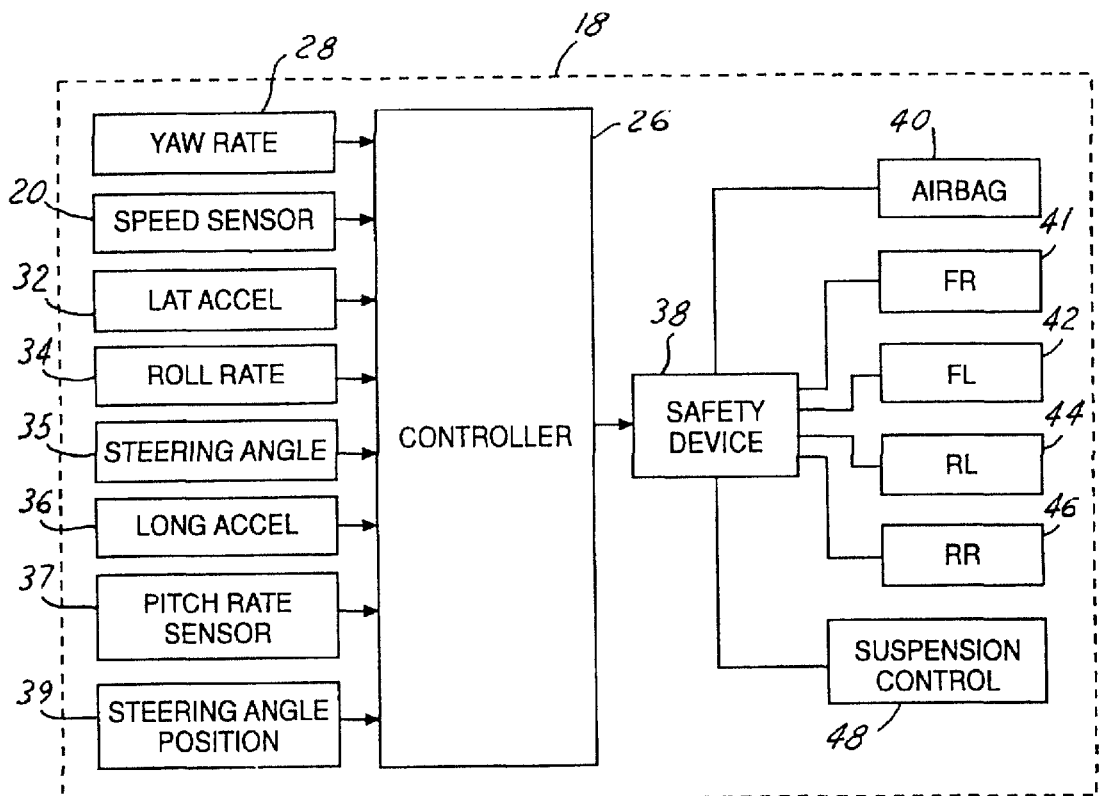
FIG. 2 is a block diagrammatic view of the control system.

Referring now to FIG. 2, yaw stability control system 18 has a controller 26 used for receiving information from a number of sensors which may include a yaw rate sensor 28, a speed sensor 20, a lateral acceleration sensor 32, a roll rate sensor 34, a steering angle sensor 35, a longitudinal acceleration sensor 36, a pitch rate sensor 37 and steering angle position sensor 39.

In the preferred embodiment only two axial rate sensors are used. When two of these axial rates are known, the other may be derived using other commonly available sensors.

In the preferred embodiment the sensors are located at the center of gravity of the vehicle. Those skilled in the art will recognize that the sensor may also be located off the center of gravity and translated equivalently thereto.

Also, pitch rate sensor 37 is illustrated, but can be eliminated in the preferred embodiment. As will be seen below, only two axial-type sensors are used while the third axial direction is derived.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 28–37 may be used in a commercial embodiment. Safety device 38 may control an airbag 39 or a steering action or braking action at one or more of the wheels 40, 42, 44, 46 of the vehicle. Also, other vehicle components such as a suspension control 48 may be used to adjust the suspension to prevent rollover.

Roll rate sensor 34 and pitch rate sensor 37 may sense the roll attitude of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 and pitch rate sensor 37 may also sense the roll attitude based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll attitude may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll attitude of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Steering control 38 may control the position of the front right wheel actuator 40, the front left wheel actuator 42, the rear left wheel actuator 44, and the right rear wheel actuator 46. Although as described above, two or more of the actuators may be simultaneously controlled. For example, in a rack-and-pinion system, the two wheels coupled thereto are simultaneously controlled. Based on the inputs from sensors 28 through 39, controller 26 determines a roll condition and controls the steering position of the wheels.

Speed sensor 30 may be one of a variety of speed sensors known to those skilled in the art. For example, a suitable speed sensor may include a sensor at every wheel that is averaged by controller 26. Preferably, the controller translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. Speed may also be obtained from a transmission sensor. For example, if speed is determined while speeding up or braking around a corner, the lowest or highest wheel speed may not be used because of its error. Also, a transmission sensor may be used to determine vehicle speed.

Figure 3:
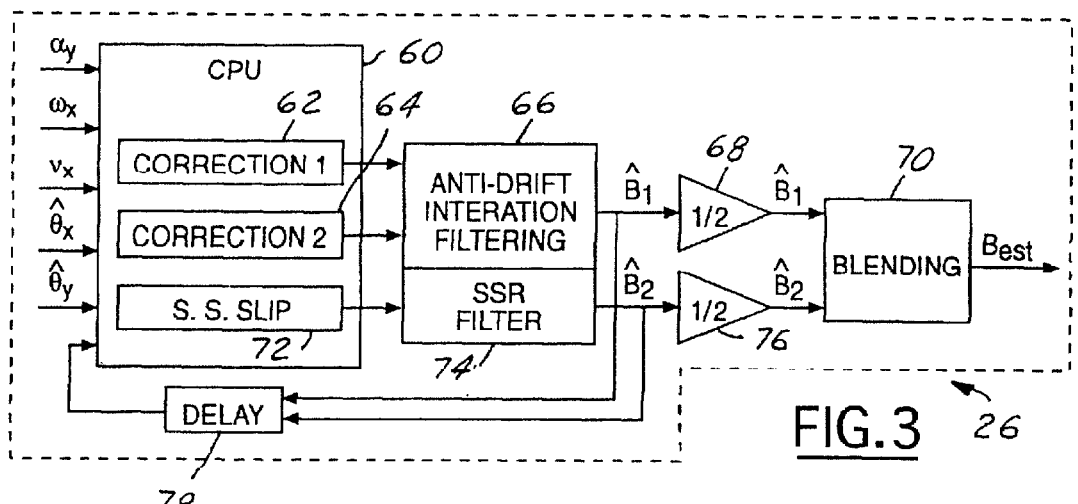
FIG. 3 is a block diagrammatic view within the controller 26.

Referring now to FIG. 3, controller 26 is illustrated in further detail. Controller 26 has a CPU 60 that is programmed to perform various functions. CPU 60 receives various input signals from the sensors above. As is shown, lateral acceleration $\alpha_y$, yaw rate $\omega_z$, lateral velocity $v_y$, and pitch and roll attitudes are input thereto. CPU 60 as will be further described below, determines the side slip angle in two ways. The side slip angle is first determined and two correction blocks 62 and 64 are factored therein. The first correction to the side slip angle velocity is due to gravity and the vehicle attitude change while the second correction is based upon the side slip velocity due to non-linearities. The side slip angle is then determined based on the first correction of the second correction which is passed to an anti-integration drift filter 66. To result in a first side slip angle $\hat{B}_1$ this result is buffered in buffer 68 and provided to a blending block 70. The side slip angle is also determined in steady state in block 72 which is then provided to a steady state recovery filter 74. The output $\hat{B}_2$ of the steady state recovery filter 74 is provided to buffer 76, which in turn is provided to blending block 70. By combining both methods for determining the side slip angle, a better estimation of side slip angle $B_{est}$ is provided to the handling or safety device 38 shown above in FIG. 2. Of course, each of these calculated side slip angles may be provided to a delay block 78 and fed back to CPU 60 so that the process is an iterative process using feedback. The process is described below in further detail.

Nonlinear Side-Slip Angle Characterization

As mentioned above, the vehicle slide slip angle $\beta$ is a key variable used in yaw stability control. The side slip angle is defined as the angle between the total vehicle velocity measured along the vehicle body frame around the center of gravity of the vehicle and the longitudinal direction of the vehicle, or say $$\tan(\beta) = \frac{v_y}{v_x} \qquad (2)$$

where $v_x$ and $v_y$ are the longitudinal and lateral velocities of the center of gravity of the vehicle, measured in the body fixed x and y directions.

The kinematics between motion variables captures the relationship between motion variables regardless of the system dynamics, or say which is independent of the magnitude of the forces and loadings applied to the system. Since the forces applied to the tires are saturated when the vehicle is driven in the nonlinear range of its lateral dynamics, and the saturated tire forces are vary hard to be accurately characterized accurately, therefore seeking kinematics to relate the vehicle side slip angle $\beta$ to other available motion variables is very useful to determine the side slip angle for all possible vehicle driving and road conditions. For this purpose a kinematics equation for $\beta$ is determined. The side-slip angle $\beta$ can be expressed as:

$$\beta = \tan^{-1}\left\{\frac{v_y}{v_x}\right\} \qquad (3)$$

The time derivative for $\beta$ in Equation (3) results in the following:

$$\dot{\beta} = \frac{1}{1+(v_y/v_x)^2} \frac{d}{dt}\left(\frac{v_y}{v_x}\right) \qquad (4)$$

Further simplification of Equation (4) leads to the following first order ordinary nonlinear differential equation for $\beta$:

$$\dot{\beta} = \frac{\dot{v}_y}{v_x}\cos^2(\beta) - \frac{\dot{v}_x}{v_x}\sin(\beta)\cos(\beta) \qquad (5)$$

where the time derivative for the velocities $v_x$ and $v_y$ used in Equation (5) are scalar derivatives, i.e., the derivatives are taken when $v_x$ and $v_y$ are assumed to be two scalar variables without referring the fact that there are two vector component of the velocity vector. This is similar to saying that the derivatives are taken for $v_x$ and $v_y$ in the body fixed frame.

By comparing (1) and (5), we can find that Equation (1) is an approximation of Equation (5) if and only if the small angle assumption assumes the following $$\cos^2(\beta) \approx 1$$

$$\sin(\beta)\cos(\beta) \approx \beta \qquad (7)$$

or say equivalently:

$$\cos(2\beta) = 2\cos^2(\beta) - 1 \approx 1$$

$$\sin(2\beta) = 2\sin(\beta)\cos(\beta) \approx 2\beta \qquad (8)$$

Equation (7) implies that the approximation obtained in Equation (1) requires the double side slip angle being a small angle, instead of the side slip angle be small. This places more severe limitation on the valid application range: the actual valid range must be reduced. That is, in order for the method in U.S. Pat. No. 5,732,377 to work well, the range of the side slip angle needs to be reduced to half of its desired range. This drawback limits the further application of the first method. In order to make the impact of the double side slip angle clear, Equation (5) may be rewritten using the double side slip angle DSSA:

$$DSSA = 2\beta \qquad (9)$$

as the following nonlinear differential equation:

$$\frac{d}{dt}DSSA = \frac{\dot{v}_y}{v_x}(1 + \cos(DSSA)) - \frac{\dot{v}_x}{v_x}\sin(DSSA) \qquad (10)$$

In summary, Equation (10) provides a universal characterization for the side slip angle $\beta$, which is independent of the forces applied to the vehicle and independent of the possible range limitation for $\beta$ ($\beta$ could be a very large angle). The time derivative $$\frac{d}{dt}DSSA$$

of double side slip angle DSSA is called the side slip angle velocity.

Nonlinear Side-Slip Angle Considering Vehicle Attitudes

When $v_x$, $\dot{v}_x$ and $\dot{v}_y$ can be calculated from the measured variables, or the variables calculated from the measured values, or the past values of DSSA, then Equation (10) is solvable for the current value of DSSA. Notice that the acceleration $\dot{v}_y$ is related to the lateral acceleration sensor signal and $v_x$, $\dot{v}_x$ are related to the wheel speed sensor signals.

The longitudinal velocity $v_x$ is a function of the double side slip angle DSSA and the wheel speed sensor signals $\omega_{lf}, \omega_{rf}, \omega_{lr}, \omega_{rr}$ $$v_x = f(DSSA, \omega_{lf}, \omega_{rf}, \omega_{lr}, \omega_{rr}) \qquad (11)$$

The acceleration $\dot{v}_y$ is actually part of the lateral acceleration. In order to calculate $\dot{v}_y$, the content of the lateral acceleration sensor output $\alpha_y$ must take away the gravity portion $\alpha_{y\text{-}gravity}$ due to the roll and pitch attitude angle and the gravity g, the yaw portion $\alpha_{y\text{-}yaw}$ due to vehicle velocity $v_x$ and the yaw rate $\omega_z$ and $\dot{v}_y$. If considering all the above effects, $\alpha_y$ can be related to $\dot{v}_y$ as in the following:

$$a_y = a_{y\text{-}gravity} + a_{y\text{-}lata} + a_{y\text{-}yaw} \qquad (12)$$

where $$a_{y\text{-}gravity} = g\sin(\theta_x)\cos(\theta_y)$$

$$a_{y\text{-}yaw} = \omega_z v_x$$

$$a_{y\text{-}lata} = \dot{v}_y \qquad (13)$$

where $\theta_x$ and $\theta_y$ are the global roll and pitch attitude angles, which can be estimated as in U.S. Application Ser. No. 09/967,038, the disclosure of which is incorporated by reference herein. In addition, $\omega_z$ is the yaw rate and $\alpha_y$ is the lateral acceleration. Thus, this provides a correction factor based on gravity and attitude changes.

Hence $\dot{v}_y$ can be computed as the following $$\dot{v}_y = \alpha_y - \omega_z v_x - g\sin(\theta_x)\cos(\theta_y) \qquad (14)$$

By inserting Equation (14) into the nonlinear differential Equation (10), the following equation for the double slip angle DSSA is obtained $$\frac{d}{dt}DSSA = \left[-\omega_z + \frac{a_y - g\sin(\theta_x)\cos(\theta_y)}{v_x}\right](1 + \cos(DSSA)) - \frac{\dot{v}_x}{v_x}\sin(DSSA) \qquad (15)$$

This provides two corrections based on non-linearity of $\beta$ kinematics and the gravity effect. Notice that direct integration of Equation (14) to obtain $v_y$ shares the same integration drifting problem, and along with being more sensitive to the sensor noise than a dynamic system of a feedback structure as in Equation (15). If the signal to noise ratio in $$\alpha_y - \omega_z v_x - g\sin(\theta_x)\cos(\theta_y) \qquad (16)$$

is not large enough, the outcome of integrating Equation (14) would not lead to any useful information. While in Equation (15), even:

$$\frac{a_y - \omega_z v_x - g\sin(\theta_x)\cos(\theta_y)}{v_x} \qquad (17)$$

does not have large signal-to-noise ratio, the second term in the right hand side of Equation (15) can still generate reasonable result for DSSA. Hence in summary, the "closed loop structure" in Equation (15) for characterizing side slip angle $\beta$ is much more robust than the "open loop structure" in Equation (14) is for characterizing the vehicle lateral velocity $v_y$.

Anti-Drift Integration for Slide-Slip from the Differential Equation

A universal characterization for the double side slip angle DSSA with a correction based on gravity and attitude change and a corrected based on non-linearity factored therein. The nonlinear differential equation is then solved in a digital environment.

In order to solve the nonlinear differential Equation (15) on real time for the double side slip angle DSSA, a digital integration process is used. A simple Euler integration can be written as the following $$DSSA(k+1)=DSSA(k)+\Delta T*DSSA\_VEL(k+1) \quad DSSA(0)=DSSA_0 \quad (18)$$

where DSSA(k+1) and DSSA_VEL(k+1) mean the values of variable and DSSA_VEL at the (k+1)th sampling time instant, for k=0, 1, 2, ..., and with DSSA_VEL having the following form:

$$DSSA\_VEL(k+1)) = -\omega_z(k+1)*[1+\cos(DSSA(k))] + \quad (19)$$
$$\frac{a_y(k+1) - g*\sin(\theta_x(k+1))*\cos(\theta_y(k+1))}{v_x(k+1)}[1+\cos(DSSA(k))] -$$
$$\frac{\dot{v}_x(k+1)}{v_x(k+1)}\sin(DSSA(k))$$

$DSSA_0$ is the initial vehicle double side slip angle, which is usually zero.

Although iterative scheme summarized in (18) and (19) provides a feasible computation algorithm for the double side slip angle DSSA, it shares the common drawback occurring in the digital implementation of the pure integration. That is low frequency drift happens. In order to eliminate the pure-integration-induced side slip angle drift, an anti-integration-drift (AID) filter is used. This AID filter has the following form $$T_{AID}(z^{-1}) = \frac{d_1(1-z^{-2})}{1-c_1 z^{-1}+c_2 z^{-2}} \quad (20)$$

where d, $c_1$ and $c_2$ are properly chosen filter coefficients.

A digital implementation of the solver for Equation (15) using AID filter can be expressed as the following:

$$DSSA_{AID}(k+1)=c_1 DSSA_{AID}(k)-$$
$$c_2 DSSA_{AID}(k-1)+d_1[DSSA\_VEL(k+1)-DSSA\_VEL(k-1)]$$
$$DSSA_{AID}(0)=DSSA_0 \quad (21)$$

The iterative process described in Equation (21) eliminates the cumulative integration error due to low frequency drift met in U.S. Pat. No. 5,732,377. However the non-drift but low frequency side slip angle could not be well captured, since it is removed as the low frequency drift. In reality the vehicle could have constant non-zero or low frequency side slip angle. Hence a steady state recovery scheme is used in the next section.

Model-Based Steady State Recovery for Slide-Slip

Using the bicycle model, the yaw and lateral dynamics of a vehicle can be described by the following differential equation:

$$I_z \dot{\omega}_z = t_f F_f \cos(\delta) - t_r F_r + M_z$$
$$M[a_y - g\sin(\theta_x)\cos(\theta_y)] = F_f \cos(\delta) + F_r \quad (22)$$

where $F_f$ and $F_r$ are the lateral forces applied to the front axle and rear axle through tires respectively; $M_z$ is the yawing moment due to yaw stability control, which can be estimated based on the desired yaw stability command and the estimated road surface $\mu$; $I_z$ is the yaw momentum of inertia of the vehicle; M is the vehicle total mass; $t_f$ is the distance from the vehicle center of gravity to the front axle; $t_r$ is the distance from the vehicle center of gravity to the rear axle; $\delta$ is the steering angle at the front wheels;

Let $\alpha_f$ and $\alpha_r$ be the front and rear wheel side slip angles respectively, which can be expressed as:

$$\alpha_f = \beta + \frac{l_f \omega_z}{v_x} - \delta \quad (23)$$
$$\alpha_r = \beta - \frac{l_r \omega_z}{v_x}$$

For small wheel side slip angles, i.e.

$$|\alpha_f| \leq \overline{\alpha}_f$$
$$|\alpha_r| \leq \overline{\alpha}_r \quad (24)$$

the lateral forces applied to the front axle and the rear axle obey the linear relationship as the following:

$$F_f = c_f \alpha_f$$
$$F_r = c_r \alpha_r \quad (25)$$

where $\overline{\alpha}_f$ and $\overline{\alpha}_r$ are front and rear wheel slip angle upper bounds to guarantee the linear relationships in Equation (25) $c_f$ and $c_r$ are the cornering stiffness of the front and rear tires and $l_r$ and $l_f$ are the distances between the rear tires (track) and the front tires (track), respectively.

Due to the steering angle and large loading towards the front axle, the front wheel side slip angle $\alpha_f$ usually exceeds the linear range of the tire force much earlier than the rear axle tires.

Notice that the dynamics in (22) is true regardless of the nonlinear or linear tire forces. Therefore the tire forces may be calculated from the measured sensor signals and the calculated yawing moment as the following regardless the range of the tire side slip angles.

$$F_f = \frac{I_z \dot{\omega}_z - M_z + t_r M[a_y - g\sin(\theta_x)\cos(\theta_y)]}{t_f \cos(\delta)} \quad (26)$$
$$F_r = \frac{-I_z \dot{\omega}_z + M_z + t_f M[a_y - g\sin(\theta_x)\cos(\theta_y)]}{t_r}$$

Hence, the steady state side slip angle can be computed from $F_r$ in Equation (26) and the relationship Equation (23) and Equation (25), this side slip angle may be called yaw-lateral dynamics side slip angle or the steady state side slip angle and denote it as $\beta_{lat-yaw}$:

$$\beta_{lat-yaw} = \frac{l_r \omega_z}{v_x} + \frac{-I_z \dot{\omega}_z + M_z + t_f M[a_y - g\sin(\theta_x)\cos(\theta_y)]}{t_r c_r} \quad (27)$$

Or in digital environment $$\beta_{lat-yaw}(k) = \quad (28)$$
$$\frac{l_r \omega_z(k)}{v_x(k)} + \frac{-I_z \dot{\omega}_z(k) + M_z(k) + t_f M[a_y(k) - g\sin(\theta(k)_x)\cos(\theta_y(k))]}{t_r c_r}$$

Due to the fact that Equation (26) is valid regardless of the magnitude of the wheel side slip angle $\alpha_r$, while Equation (25) is only valid when the vehicle is driven in a stable condition (the vehicle side slip angle velocity $\dot{\beta}$ is close to zero), hence $\beta_{lat-yaw}$ should be a good capture of the steady state value of the actual vehicle side slip angle. However when $\dot{\beta}$ is large, or say the lateral dynamics of vehicle is in nonlinear range and the tire force would not obey the linear relationship described in Equation (25). In this case the error between the actual $\beta$ and $\beta_{lat-yaw}$ is big. Thus, $\beta_{lat-yaw}$ may only be used to achieve the steady state recovery. That is, by passing $\beta_{lat-yaw}$ to a filter, then the filtered output should well capture the steady state value of the actual side slip angle, and will not contribute much during unstable driving condition.

If the anti-drift integration filter has the following transfer function:

$$T_{AID}(s) = \frac{s}{s^2 + e_1 s + e_2} \tag{29}$$

with properly chosen filter coefficients $e_1$ and $e_2$, then a steady state recovery filter will have the following form:

$$T_{SSR}(s) = \frac{e_1 s + e_2}{s^2 + e_1 s + e_2} \tag{30}$$

The steady state value can be computed as:

$$\beta_{steady-state} = T_{SSR}(s)\beta_{lat-yaw} \tag{31}$$

or in digital environment:

$$\beta_{steady-state}(k+1) = c_1 \beta_{steady-state}(k) - c_2 \beta_{steady-state}(k-1)] + \tag{32}$$
$$f_1 \beta_{lat-yaw}(k+1) + f_2 \beta_{lat-yaw}(k) + f_3 \beta_{lat-yaw}(k-1)$$

with proper filter coefficients $c_1, c_2, f_1, f_2$ and $f_3$.

Side Slip Angle Dynamic Blending

A dynamic blending of the corrected side slip angle velocity DSSA_VEL based on the two types of corrections described above and the steady state side slip angle $\beta_{lat-yaw}$ from the lateral and yaw dynamics can be obtained as the following:

$$\hat{\beta} = \hat{\beta}_{dyn} + \hat{\beta}_{stat} \tag{33}$$

where the first term in the right hand side of Equation (33) reflects the dynamic portion of the double side slip angle since the low frequency portion has been removed for the purpose of anti-drift $$\hat{\beta}_{dyn} = T_{AID}(s)\frac{DSSA\_VEL}{2} \tag{34}$$

while the second term only contribute in low frequency region $$\hat{\beta} = T_{SSR}(s)\beta_{lat-yaw} \tag{35}$$

Notice the dynamic blending scheme (33) advantageously achieves:

Since $T_{AID}(s)s + T_{SSR}(s) = 1$, hence if DSSA=$2\dot{\beta}_{lat-yaw}$, i.e., if the vehicle is driven within its linear lateral dynamics region, then from the dynamic blending (33) we have $$\hat{\beta} = \frac{DSSA}{2} \tag{36}$$

In steady state, the DC term of $\hat{\beta}$ is equal to the DC term of $\beta_{lat-yaw}$ (since $T_{AID}(0)=0$), which is a good capture of the actual steady state side slip angle $$\hat{\beta} = \hat{\beta}_{dyn} + \hat{\beta}_{stat} \approx \hat{\beta}_{stat} = T_{SSR}(s)\beta_{lat-yaw} \tag{37}$$

In high frequency region, since $$T_{AID}(s) \approx \frac{1}{s} \text{ and } T_{SSR}(s) \approx \frac{e_1}{s},$$

the effect of $\hat{\beta}_{stat}$ is negligible, i.e.

$$\hat{\beta} = \hat{\beta}_{dyn} + \hat{\beta}_{stat} \approx \frac{1}{s}\frac{DSSA\_VEL}{2} + \frac{e_1}{s}\beta_{yaw-lat} \tag{38}$$
$$\approx \frac{1}{s}\frac{DSSA\_VEL}{2}$$
$$= \frac{DSSA}{2}$$

Notice that (33) needs to be integrated with (19) in order to obtain accurate estimation $$DSSA\_VEL(k+1) = -\omega_z(k+1)*[1 + \cos(2\hat{\beta}(k))] + \tag{39}$$
$$a_y(k+1) -$$
$$g*\sin(\theta_x(k+1))*$$
$$\frac{\cos(\theta_y(k+1))}{v_x(k+1)}[1 + \cos(2\hat{\beta}(k))] -$$
$$\frac{\dot{v}_x(k+1)}{v_x(k+1)}\sin(2\hat{\beta}(k))$$

Figure 4:
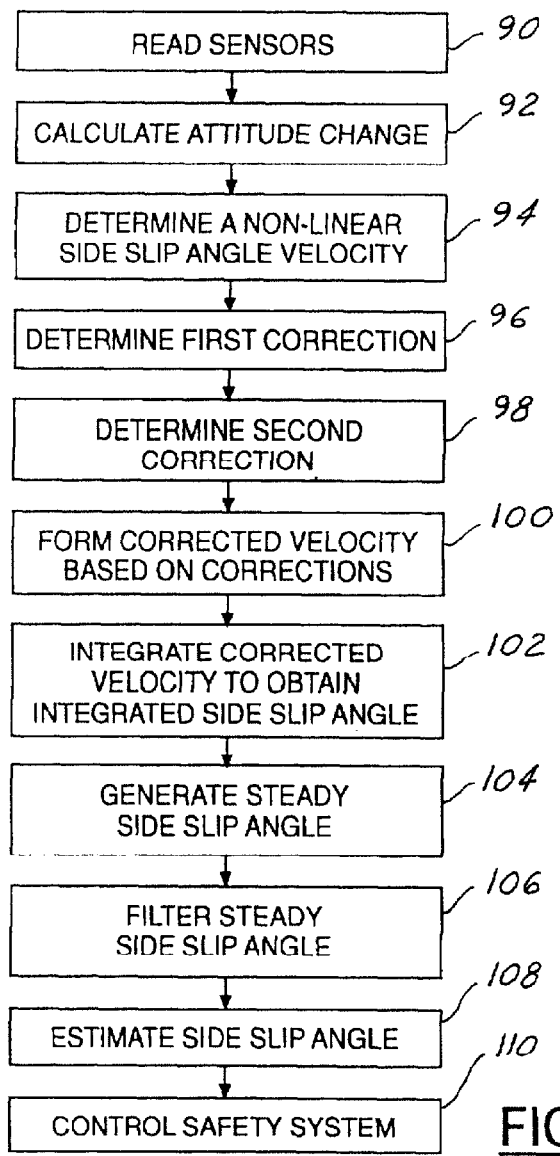
FIG. 4 is a flow chart of the operation of the control system according to the present invention.

Referring now to FIG. 4, a high level flow chart of the operation of the system described above is illustrated. In step 90, the various sensors are read. In step 92 the attitude changes are calculated. In step 94 the non-linear side slip angular velocity is determined. As mentioned above, the angular velocity may be determined using many different signals in combination such as the yaw rate, the lateral acceleration, and the vehicle velocity.

In step 96, a first correction to the side slip angle velocity due to gravity and attitude change factors is determined. In step 98 a second correction is performed to the side slip angle velocity based on the non-linearity of the determination in step 94. The corrected velocity is formed in step 100. In step 102 the corrected side slip velocity is integrated to obtain an integrated side slip angle.

In step 104, a second side slip angle is determined. In step 104 the side slip angle is a steady state side slip angle. In step 106 the steady state side slip angle is filtered. Preferably, the filtering uses a steady state recovery filter.

By combining the integrated side slip angle and the steady state side slip angle of step 106, step 108 estimates the side slip angle. This information may be used directly to generate a yaw stability control signal to control a YSC system or control other handling and safety systems as illustrated in step 110. Various combinations of braking and steering may be performed to prevent vehicle from spinning out or rollover. The side slip angle is preferably used in combination with other signals as is known in the art to determine the presence of spinning out and rollover.

Advantageously, the present invention provides an improved side slip angle determination that corrects for gravity and non-linearities in the formula as well as includes steady state side slip angle factors and removing low frequency drift due to the inevitable integration.

What is claimed is:

1. A method of estimating and determining a side slip angle of an automotive vehicle, comprising the steps of:
   measuring vehicle dynamic conditions;
   determining a first side slip angle due to gravity, a vehicle attitude change, non-linearity of a side slip angle velocity and the dynamic conditions;
   generating a steady state side slip angle; and
   determining a side slip angle estimation based on the first side slip angle and the steady state side slip angle.

2. A method as recited in claim 1 wherein determining a first side slip angle comprises determining a first side slip angle due to gravity, a vehicle attitude change, non-linearity of a side slip angle velocity and the dynamic conditions and an anti-drift integration filter.

3. A method as recited in claim 1 wherein generating a steady state side slip angle comprises generating a steady state side slip angle in response to a steady state recovery filter.

4. A method as recited in claim 1 wherein determining a first side slip angle comprises determining a first side slip angle due to gravity, a vehicle attitude change, non-linearity of a side slip angle velocity and the dynamic conditions and an anti-drift integration filter; and wherein generating a steady state side slip angle comprises generating a steady state side slip angle in response to a steady state recovery filter.

5. A method of estimating and determining a side slip angle of an automotive vehicle, comprising the steps of:
   measuring the yaw rate of the vehicle;
   measuring the lateral acceleration of the vehicle;
   calculating the vehicle scaler velocity;
   calculating an attitude change;
   determining a side slip angle velocity based on the scalar velocity;
   determining a first correction to side slip angle velocity due to gravity and the vehicle attitude change;
   determining a second correction to side slip angle velocity due to nonlinearity;
   forming a corrected side slip angle based on the first correction and the second correction;
   integrating the said corrected side slip angle velocity to form an integrated side slip angle;
   generating a steady state side slip angle based on the yaw rate and lateral dynamics of the vehicle;
   filtering the steady state side slip signal with a steady state recovery filter to obtain a filtered side slip angle; and
   determining a side slip angle estimation based on the integrated side slip angle and the filtered side slip angle.

6. A method as recited in claim 5 wherein calculating an attitude change comprises measuring roll rate, and longitudinal acceleration, and determining attitude change based on the roll rate, yaw rate, longitudinal acceleration and lateral acceleration.

7. A method as recited in claim 5 wherein determining a side slip angle velocity based on the scalar velocity and determining a non-linear side slip angle velocity based on the scalar velocity.

8. A method as recited in claim 5 wherein determining a second correction comprises determining the second correction as a function of $\cos^2(\beta)$, $\cos(2\beta)$, $\cos(\beta)\sin(\beta)$, $\sin(2\beta)$, where $\beta$ is the side slip angle.

9. A method as recited in claim 5 wherein the step of integrating comprises integrating through an anti-drift integration filtering (ADI filtering) such that an integration cumulative error is eliminated.

10. A method as recited in claim 5 wherein filtering comprises the steady state recovery filtering.

11. A method as recited in claim 5 wherein the side slip angle velocity $\dot{\beta}$ has the following formula $$\dot{\beta} = \frac{\dot{v}_y}{v_x}\cos^2(\beta) - \frac{\dot{v}_x}{v_x}\sin(\beta)\cos(\beta)$$

where $\dot{v}_y$ is the time derivative of the lateral velocity, $\dot{v}_x$ is the time derivative of the longitudinal velocity, $v_x$ is the longitudinal velocity and $\dot{\beta}$ is the time derivative of the side slip angle $\beta$.

12. A method as recited in claim 5 wherein the velocity of the side slip angle obeys the following differential equation $$\dot{\beta} = \left[-\omega_z + \frac{a_y - g\sin(\theta_x)\cos(\theta_y)}{v_x}\right]\cos^2(\beta) - \frac{\dot{v}_x}{v_x}\sin(\beta)\cos(\beta)$$

where $\dot{v}_y$ is the time derivative of the lateral velocity, $\dot{v}_x$ is the time derivative of the longitudinal velocity, $v_x$ is the longitudinal velocity, and $\dot{\beta}$ is the velocity of the side slip angle, $\omega_z$ is the yaw rate, $\theta_x$ is the global roll attitude angle of the vehicle body, $\theta_y$ is the global pitch attitude angle of the vehicle body.

13. A method as recited in claim 5 wherein the side slip angle velocity has the following formula $$\frac{d}{dt}DSSA = \left[-\omega_z + \frac{a_y - g\sin(\theta_x)\cos(\theta_y)}{v_x}\right](1 + \cos(DSSA)) - \frac{\dot{v}_x}{v_x}\sin(DSSA)$$

where $\dot{v}_y$ is the time derivative of the lateral velocity, $\dot{v}_x$ is the time derivative of the longitudinal velocity, $v_x$ is the longitudinal velocity, and $\dot{\beta}$ is the side slip angle velocity, $\omega_z$ is the yaw rate, $\theta_x$ is the global roll attitude angle of the vehicle body, $\theta_y$ is the global pitch attitude angle of the vehicle body, and DSSA is the double side slip angle.

14. A method as recited in claim 5 wherein generating a steady state side slip angle comprises generating a steady state side slip angle according to the formula:

$$\beta = \frac{l_r \omega_z}{v_x} + \frac{-I_z \dot{\omega}_z + M_z + t_f M[a_y - g\sin(\theta_x)\cos(\theta_y)]}{t_r c_r}$$

where $I_z$ is the yaw momentum of inertia, M is the total mass of the vehicle, $t_f$ is the distance vehicle center of gravity to the front axle, $t_r$ is the distance from the vehicle center of gravity to the rear axle and $c_r$ is the cornering stiffness of the rear tire, $\dot{\omega}_z$ is a yaw acceleration, $\omega_z$ is the yaw rate, $M_z$ is a yawing moment, g is the gravity constant, $a_y$ is the lateral acceleration, $\theta_x$ is global roll attitude angle of vehicle body, $\theta_y$ is global pitch attitude of vehicle body, $l_r$ is width of rear track, and $v_x$ is longitudinal velocity.

15. A control system for an automotive vehicle comprising:
   a yaw rate sensor for generating a yaw rate signal;
   a lateral acceleration sensor generating a lateral acceleration signal;

a speed sensor for generating a vehicle scalar velocity signal;

a longitudinal acceleration sensor generating a longitudinal acceleration signal;

a roll rate sensor generating a roll rate signal;

a controller coupled to the yaw rate sensor, the lateral acceleration sensor, the longitudinal acceleration sensor and the roll rate sensor, said controller determining an attitude change in response based on the roll rate signal, the yaw rate signal, longitudinal acceleration signal and lateral acceleration signal, determining a side slip angle velocity based on the scalar velocity, the controller determining a first correction to side slip angle velocity due to gravity and the vehicle attitude change, a second correction to side slip angle velocity due to nonlinearity and a corrected side slip angle based on the first correction and the second correction, said controller integrating the corrected side slip angle velocity to form an integrated side slip angle, generating a steady state side slip angle based on the yaw rate and lateral dynamics of the vehicle; filtering the steady state side slip signal with a steady state recovery filter to obtain a filtered side slip angle, and determining a side slip angle estimation based on the integrated side slip angle and the filtered side slip angle.

16. A system as recited in claim 15 further comprising a handling and safety system, said controller controlling the safety system in response to the integrated side slip angle.

17. A control system as recited in claim 16 wherein said handling and safety system comprises an active brake control system.

18. A control system as recited in claim 16 wherein said handling and safety system comprises an active rear steering system.

19. A control system as recited in claim 16 wherein said handling and safety system comprises an active front steering system.

20. A control system as recited in claim 16 wherein said handling and safety system comprises an active anti-roll bar system.

21. A control system as recited in claim 16 wherein said handling and safety system comprises an active suspension system.

22. A method of estimating and determining a side slip angle of an automotive vehicle comprising:

determining a first side slip angle due to a vehicle attitude change;

generating a steady state side slip angle; and determining a side slip angle estimation based on the first side slip angle and the steady state side slip angle.

23. A method as recited in claim 22 further comprising measuring vehicle dynamic conditions, wherein the step of determining a first side slip angle comprises determining a first side slip angle due to the vehicle attitude change and the vehicle dynamic conditions.

24. A method as recited in claim 23 wherein the step of determining a side slip angle comprises determining a side slip angle due to the vehicle dynamic conditions, the vehicle attitude change, and a non-linearity of a side slip angle velocity.

* * * * *